US011875732B2

(12) United States Patent
Park et al.

(10) Patent No.: US 11,875,732 B2
(45) Date of Patent: Jan. 16, 2024

(54) SCREEN SAVER CONTROLLER, DISPLAY DEVICE INCLUDING THE SAME AND METHOD OF OPERATING A DISPLAY DEVICE INCLUDING THE SAME

(71) Applicant: SAMSUNG DISPLAY CO., LTD., Yongin-si (KR)

(72) Inventors: Hee Sook Park, Suwon-si (KR); Ki Hyun Pyun, Gwangmyeong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 86 days.

(21) Appl. No.: 17/386,700

(22) Filed: Jul. 28, 2021

(65) Prior Publication Data

US 2022/0122517 A1 Apr. 21, 2022

(30) Foreign Application Priority Data

Oct. 20, 2020 (KR) ........................ 10-2020-0136183

(51) Int. Cl.
*G09G 3/22* (2006.01)

(52) U.S. Cl.
CPC ....... *G09G 3/22* (2013.01); *G09G 2300/0439* (2013.01); *G09G 2330/022* (2013.01)

(58) Field of Classification Search
CPC ........... G09G 2330/022; G09G 3/3233; G09G 2320/0233; G09G 2320/043;
(Continued)

(56) References Cited

U.S. PATENT DOCUMENTS

| | | | | |
|---|---|---|---|---|
| 6,337,542 B1 * | 1/2002 | Hanaki | ................ | G09G 3/3216 345/215 |
| 7,865,846 B2 * | 1/2011 | Kim | ......................... | G09G 3/22 715/867 |

(Continued)

FOREIGN PATENT DOCUMENTS

| | | |
|---|---|---|
| EP | 3869492 | 8/2021 |
| KR | 10-0271132 | 8/2000 |

(Continued)

OTHER PUBLICATIONS

ESSR Dated Feb. 24, 2022 In Corresponding Application No. EP 21202011.9.

*Primary Examiner* — Priyank J Shah
(74) *Attorney, Agent, or Firm* — F. Chau & Associates, LLC

(57) ABSTRACT

A screen saver controller includes a load calculator for generating load data of each of a plurality of panel blocks included in a display panel based on input image data, a life calculator for generating life data of each of the panel blocks based on a deterioration stress value accumulated in the display panel, a first logic circuit for receiving the load data and the life data, and generating operation data based on the load data and the life data and a second logic circuit for receiving the input image data and the operation data, and generating screen saver data based on the input image data and the operation data. The screen saver controller adjusts a luminance of the display panel based on the screen saver data when operating in a screen saver mode for performing a screen saver operation.

15 Claims, 10 Drawing Sheets

(58) Field of Classification Search
CPC .... G09G 2320/0626; G09G 2320/0295; Y10S 715/00
See application file for complete search history.

(56) References Cited

U.S. PATENT DOCUMENTS

| | | | | |
|---|---|---|---|---|
| 9,373,279 | B2 | 6/2016 | Lowles | |
| 2011/0199396 | A1* | 8/2011 | Lee | G09G 3/30 345/690 |
| 2016/0217731 | A1* | 7/2016 | Joo | G09G 3/3208 |
| 2018/0190174 | A1* | 7/2018 | Kambhatla | G06T 1/20 |
| 2019/0213953 | A1 | 7/2019 | Koh et al. | |
| 2020/0218204 | A1* | 7/2020 | Koh | G04G 9/10 |
| 2021/0264877 | A1 | 8/2021 | Pyun et al. | |
| 2022/0051624 | A1 | 2/2022 | Pyun et al. | |
| 2023/0086843 | A1* | 3/2023 | Lin | G09G 3/20 345/156 |

FOREIGN PATENT DOCUMENTS

| | | |
|---|---|---|
| KR | 1020030093501 | 12/2003 |
| KR | 10-0438539 | 6/2004 |
| KR | 10-0497344 | 6/2005 |

* cited by examiner

SCREEN SAVER CONTROLLER, DISPLAY DEVICE INCLUDING THE SAME AND METHOD OF OPERATING A DISPLAY DEVICE INCLUDING THE SAME

CROSS-REFERENCE TO RELATED APPLICATIONS

This non-provisional patent application claims priority under 35 USC § 119 to Korean Patent Application No. 10-2020-0136183 filed on Oct. 20, 2020 in the Korean Intellectual Property Office KIPO, the entire disclosure of which is incorporated by reference herein.

1. TECHNICAL FIELD

Embodiments of the present inventive concept relate to a display device. More specifically, embodiments of the present inventive concept relate to a screen saver controller, a display device including the same and a method of operating a display device including the same.

2. DISCUSSION OF RELATED ART

A display device may include a display panel and a display panel driver. The display panel include pixels. Image data input to the pixels causes display of an image. The display panel may be connected to the display panel driver through gate lines and data lines. The display panel driver may include a gate driver that provides a gate signal to the display panel through the gate lines, a data driver that provides a data voltage to the display panel through the data lines, and a timing controller that controls the gate driver and the data driver.

The display device may operate in a screen saver mode when a predetermined condition is satisfied. When the display device operates in the screen saver mode, the display device may output a black image to the display panel or perform an operation of lowering the luminance of the display panel. A conventional display device operates in the screen saver mode without considering load data of the display panel and life data of the display panel. Accordingly, even when the screen saver mode is operated, an afterimage is perceivable on the conventional display device, and the lifespan of the display panel is reduced.

SUMMARY

Embodiments of the present inventive concept provide a screen saver controller capable of providing a screen saver mode optimized for a display panel by using load data and life data.

Embodiments of the present inventive concept also provide a screen saver controller capable of preventing afterimages on the display panel and increasing a lifespan of the display panel.

Embodiments of the present inventive concept also provide a display device including the screen saver controller.

Embodiments of the present inventive concept also provide a method of operating the display device including the screen saver controller.

A screen saver controller according to a present embodiment of the inventive concept includes a load calculator, a life calculator, a first logic circuit, and a second logic circuit. The load calculator is for generating load data of each of a plurality of panel blocks included in a display panel based on input image data. The life calculator is for generating life data of each of the panel blocks based on a deterioration stress value accumulated in the display panel. The first logic circuit is for receiving the load data and the life data, and generating operation data based on the load data and the life data. The second logic circuit is for receiving the input image data and the operation data, and generating screen saver data based on the input image data and the operation data. The screen saver controller adjust a luminance of the display panel based on the screen saver data when operating in a screen saver mode for performing a screen saver operation.

In an embodiment, the first logic circuit generates the operation data including start time gain data for adjusting a start time of the screen saver mode based on the load data and the life data.

In an embodiment, the first logic circuit generates the operation data including minimum luminance gain data for adjusting a minimum luminance of the screen saver mode based on the load data and the life data.

In an embodiment, the load calculator generates the load data according to a lookup table in which the load data corresponding to the input image data is stored.

In an embodiment, the first logic circuit generates the start time gain data for controlling the screen saver mode to start earlier as a value of the load data increases.

In an embodiment, the first logic circuit generates the minimum luminance gain data for adjusting the minimum luminance of the screen saver mode to be lower as a value of the load data increases.

In an embodiment, the life calculator accumulates deterioration stress values of the panel blocks to generate an accumulated value and stores the accumulated value in a nonvolatile memory device, and generates the life data according to the accumulated value.

In an embodiment, the operation data generator generates the start time gain data for controlling the screen saver mode to start earlier as a value of the life data increases.

In an embodiment, the first logic circuit generates the minimum luminance gain data for adjusting the minimum luminance of the screen saver mode to be lower as a value of the life data increases.

In an embodiment, the first logic circuit generates the start time gain data and the minimum luminance gain data based on the load data of a first panel block having a greatest load data among the panel blocks, and the life data of the first panel block.

In an embodiment, the first logic circuit generates the start time gain data and the minimum luminance gain data based on the load data of a first panel block having a greatest load data among the panel blocks, and the life data of a second panel block having a greatest life data among the panel blocks.

In an embodiment, the first logic circuit generates the start time gain data and the minimum luminance gain data based on an average of the load data of the panel blocks, and an average of the life data of the panel blocks.

In an embodiment, a display device includes the above screen saver controller, a display panel including a plurality of pixels, a data driver for providing a data signal to the display panel, a gate driver for providing a gate signal to the display panel, and a timing controller for controlling the data driver and the gate driver.

An embodiment of a method of operating a display device includes: generating load data of each of a plurality of panel blocks included in a display panel of the display device based on input image data; generating life data of each of the panel blocks based on an deterioration stress value accumulated in the display panel; generating operation data based on the load data and the life data; generating screen saver data based on the input image data and the operation data; adjusting a luminance of the display panel based on the screen saver data when operating in a screen saver mode for performing a screen saver operation.

In the method, the generating of the operation data may include generating start time gain data for adjusting a start time of the screen saver mode based on the load data and the life data.

In the method, the generating of the life data may include determining deterioration stress values of each of the panel blocks, accumulating the determined deterioration stress values to generate an accumulated value, and generating the life data from the accumulated value.

In the method, the load data of a corresponding one of the panel blocks may be an intensity of the corresponding panel block.

According to an embodiment of the inventive concept, a display device includes a display panel, a data driver, a gate driver, a timing controller, and a screen saver controller. The display panel includes a plurality of panel blocks, where each of the panel blocks includes a plurality of pixels. The data driver is for providing a data signal to the display panel. The gate driver is for providing a gate signal to the display panel. The timing controller is for controlling the data driver and the gate driver. The screen saver controller is configured to calculate load data for each of the plurality of panel blocks, calculate life data based on a deterioration stress value for each of the plurality of panel blocks, generate a minimum luminance based on the load data and the life data, and decrease a luminance of the display panel to the minimum luminance when operating in a screen saver mode for performing a screen saver operation.

The screen saver controller may operate in the screen saver mode when image data provided from the timing controller indicates a static image is present.

In an embodiment, the screen saver controller gradually decreases the luminance of the display panel to the minimum luminance, and maintains the luminance at the minimum luminance until exiting the screen saver mode.

An embodiment of the screen saver controller of the present inventive concept may provide a screen saver mode optimized for the display panel by using the load data and the life data of the display panel, so that visual recognition of the afterimage of the display panel can be improved.

In addition, an embodiment of the screen saver controller may provide a screen saver mode optimized for the display panel by using the load data and the life data of the display panel, so that the lifespan of the display panel can be increased.

BRIEF DESCRIPTION OF THE DRAWINGS

Illustrative, non-limiting embodiments of the inventive concept will be more clearly understood from the following detailed description in conjunction with the accompanying drawings.

DETAILED DESCRIPTION OF THE EMBODIMENTS

Figure 1:
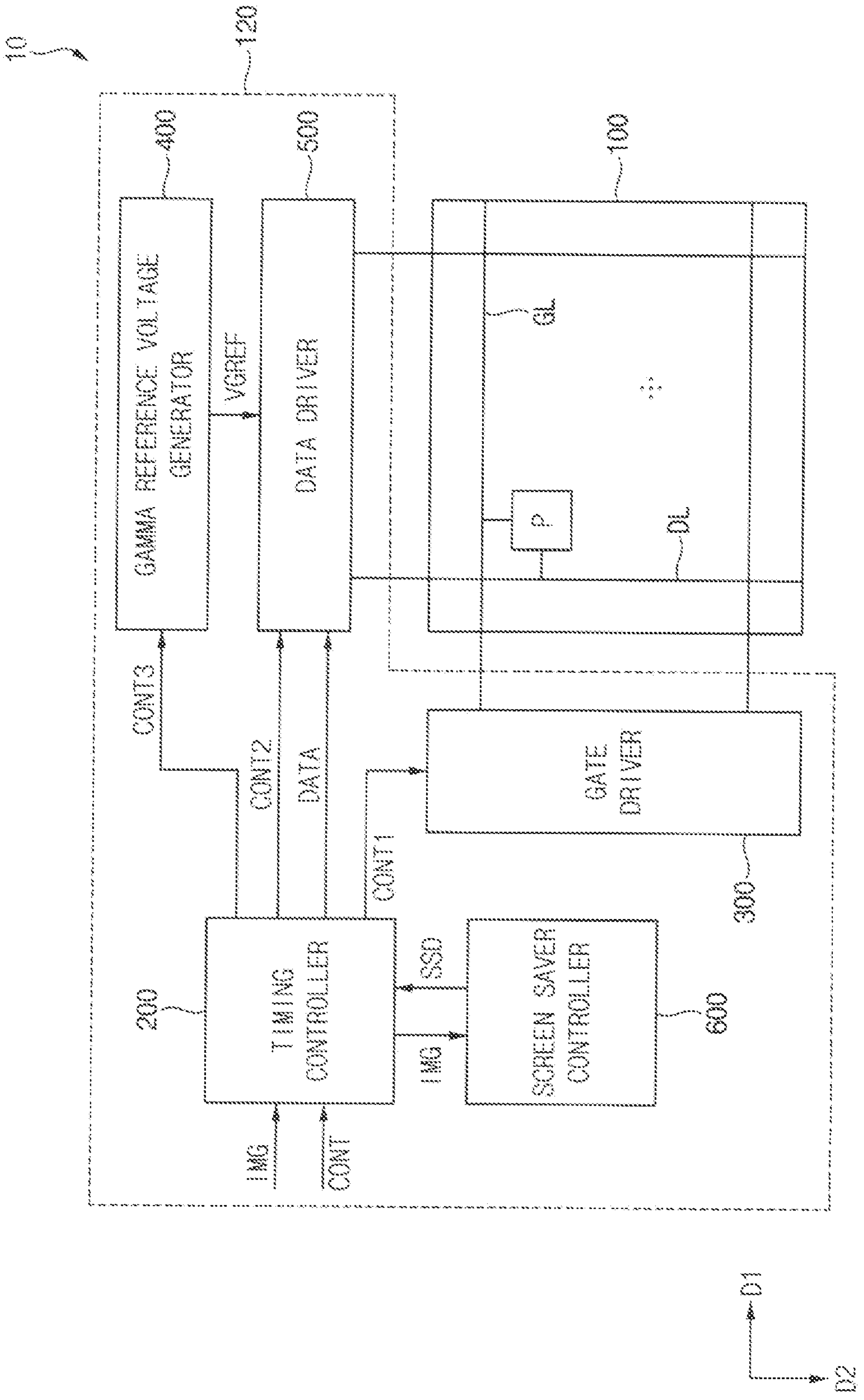
FIG. 1 is a block diagram illustrating a display device according to an embodiment of the present inventive concept.

Hereinafter, embodiments of the present inventive concept will be described in more detail with reference to the accompanying drawings. The same reference numerals are used for the same components in the drawings, and redundant descriptions of the same components will be omitted.

Figure 2A:
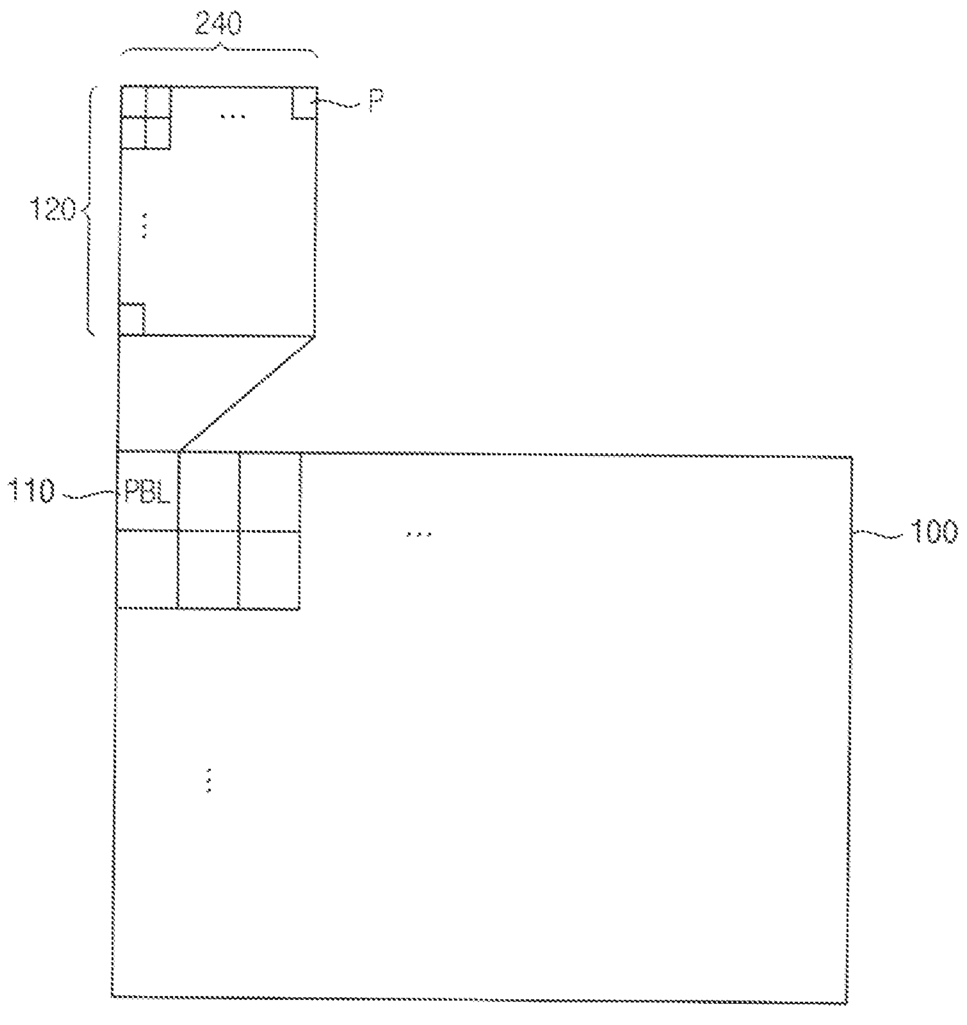
FIGS. 2*a* and 2*b* are diagrams illustrating an example of a plurality of panel blocks included in a display panel of FIG. 1.
Figure 2B:
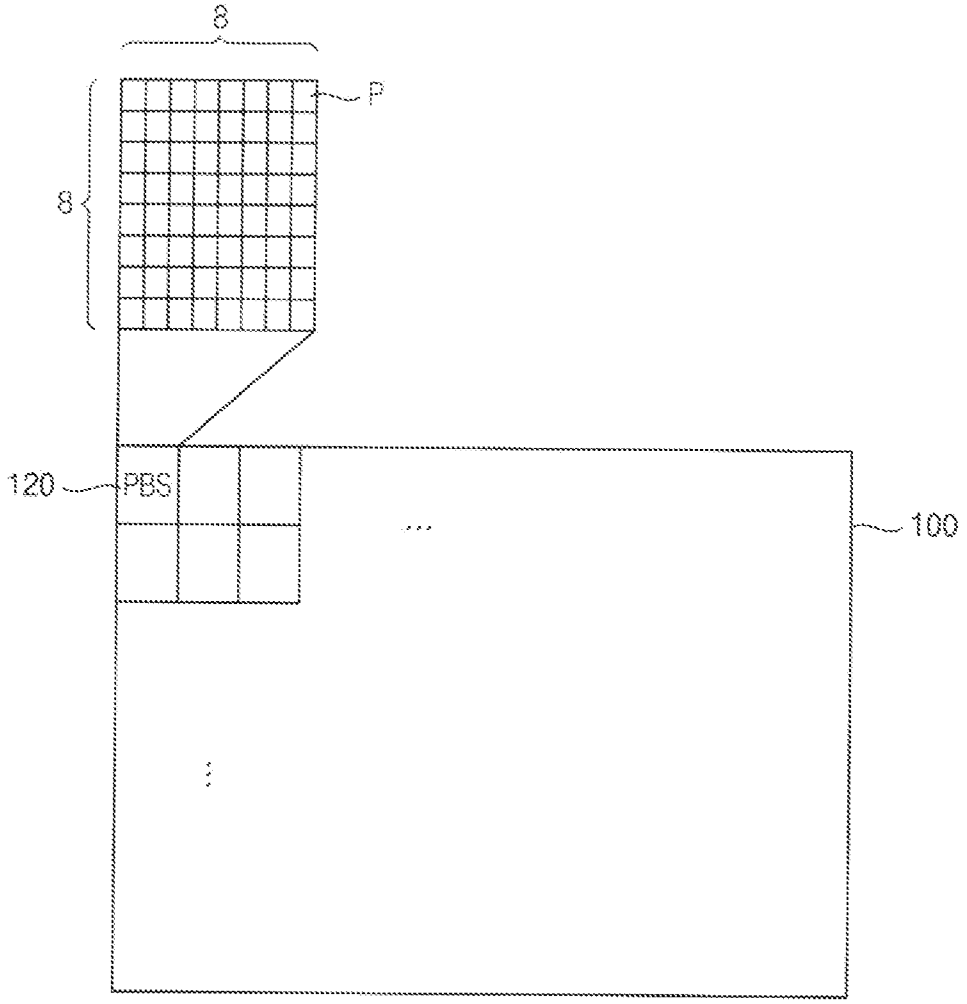

FIG. 1 is a block diagram illustrating a display device 10 according to an embodiment of the present inventive concept. FIGS. 2*a* and 2*b* are diagrams illustrating an example of a plurality of panel blocks included in a display panel 100 of FIG. 1.

Referring to FIGS. 1 to 2*b*, the display device 10 includes a display panel 100 and a display panel driver 120 (e.g., a driver circuit). The display panel driver 120 may include a timing controller 200 (e.g., a control circuit), a gate driver 300 (e.g., a driver circuit), a gamma reference voltage generator 400, and a data driver 500 (e.g., driver circuit). The display panel driver 120 may further include a screen saver controller 600 (e.g., control circuit).

The display panel 100 may include a display region for displaying an image and a peripheral region disposed adjacent to the display region. For example, the peripheral region may surround the display region.

The display panel 100 may include pixels P, and display an image corresponding to input image data by using the pixels P. The gate lines GL may extend in a first direction D1, and the data lines DL may extend in a second direction D2 intersecting the first direction D1.

The display panel 100 may include a plurality of panel blocks. In other words, the display panel 100 may be divided into a plurality of panel blocks. Each of the panel blocks may include a plurality of pixels P. In one embodiment, each of the panel blocks is a large panel block 110 (e.g., PBL). In an embodiment, the large panel block 110 includes 240*120 pixels P. In an embodiment, the display device 10 calculates load data and life data in units of the large panel block 110. In another embodiment, each of the panel blocks is a small panel block 120 (e.g., PBS). In an embodiment, the small panel block 120 includes 8*8 pixels. In an embodiment, the display device 10 calculates load data and life data in a units of the small panel block 120. The small panel block 120 has less pixels or a smaller area than the large panel block 110. The large panel block 110 is not limited to being sized to include 240×120 pixels, and the small panel bock 120 is not limited to being sized to include 8×8 pixels. For example, the large panel block 110 may be larger or smaller than 240×120 pixels, and the smaller panel block 120 may be larger or smaller than 8×8 pixels.

The timing controller 200 may receive input image data IMG and an input control signal CONT from an external device (not shown). For example, the input image data IMG received from the external device may include red image data, green image data, and blue image data. According to an embodiment, the input image data IMG further includes white image data. In another example, the input image data IMG includes magenta image data, yellow image data, and/or cyan image data. The input control signal CONT may include at least one of a master clock signal, a data enable signal, a vertical sync signal, and a horizontal sync signal.

The timing controller 200 may generate a first control signal CONT1, a second control signal CONT2, a third control signal CONT3, and a data signal DATA based on the input image data IMG and the input control signal CONT.

The timing controller 200 may generate the first control signal CONT1 for controlling an operation of the gate driver 300 based on the input control signal CONT to output the first control signal CONT1 to the gate driver 300. The first control signal CONT1 may include a vertical start signal and a gate clock signal.

The timing controller 200 may generate the second control signal CONT2 for controlling an operation of the data driver 500 based on the input control signal CONT to output the second control signal CONT2 to the data driver 500. The second control signal CONT2 may include a horizontal start signal and a load signal.

The timing controller 200 may generate the data signal DATA based on the input image data IMG. The timing controller 200 may output the generated data signal DATA to the data driver 500.

The timing controller 200 may generate the third control signal CONT3 for controlling an operation of the gamma reference voltage generator 400 based on the input control signal CONT. The timing controller 200 may output the generated third control signal CONT3 to the gamma reference voltage generator 400.

The gate driver 300 may generate gate signals for driving gate lines GL in response to the first control signal CONT1 received from the timing controller 200. The gate driver 300 may output the generated gate signals to the gate lines GL. For example, the gate driver 300 may sequentially output the gate signals to the gate lines GL. According to an embodiment, the gate driver 300 is mounted on a periphery of the display panel.

The gamma reference voltage generator 400 may generate a gamma reference voltage VGREF in response to the third control signal CONT3 received from the timing controller 200. The gamma reference voltage generator 400 may provide the generated gamma reference voltage VGREF to the data driver 500. The gamma reference voltage VGREF provided to the data driver 500 may have a value corresponding to each data signal DATA. According to an embodiment, the gamma reference voltage generator 400 is disposed in the timing controller 200 or is disposed in the data driver 500.

The data driver 500 may receive the second control signal CONT2 and the data signal DATA from the timing controller 200, and receive the gamma reference voltage VGREF from the gamma reference voltage generator 400. The data driver 500 may convert the data signal DATA having a digital format into a data voltage having an analog format by using the gamma reference voltage VGREF. The data driver 500 may output the data voltage to the data lines DL.

The screen saver controller 600 receives the input image data IMG from the timing controller 200. In an embodiment, the screen saver controller 600 generates screen saver data SSD based on the input image data IMG and outputs the screen saver data SSD to the timing controller 200. In another embodiment, the screen saver controller 600 receives the data signal DATA from the timing controller 200 and generates the screen saver data SSD based on the data signal DATA. The arrangement of the screen saver controller 600 of FIG. 1 is an example according to one embodiment of the present inventive concept. According to another embodiment, the screen saver controller 600 is disposed inside the timing controller 200 so as to be a part of the timing controller 200. According to embodiment shown in FIG. 1, the screen saver controller 600 is disposed outside the timing controller 200 to interact data with the timing controller 200. A detailed operation of the screen saver controller 600 will be described with reference to FIGS. 3 to 5.

Figure 3:
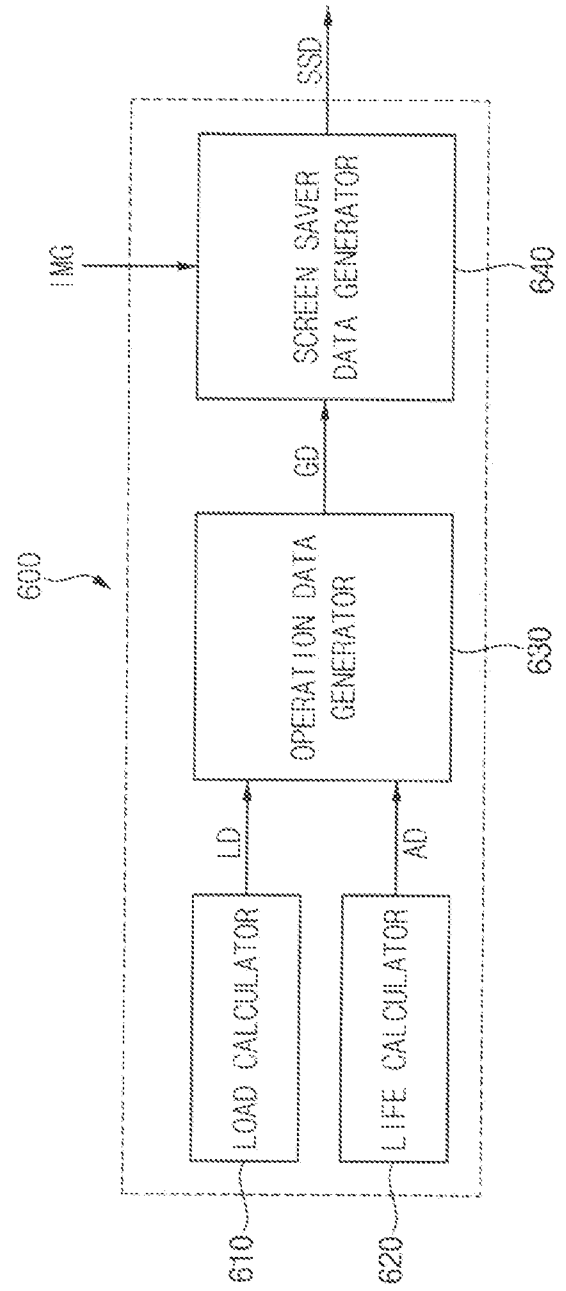
FIG. 3 is a block diagram illustrating a screen saver controller included in a display device of FIG. 1.
Figure 4A:
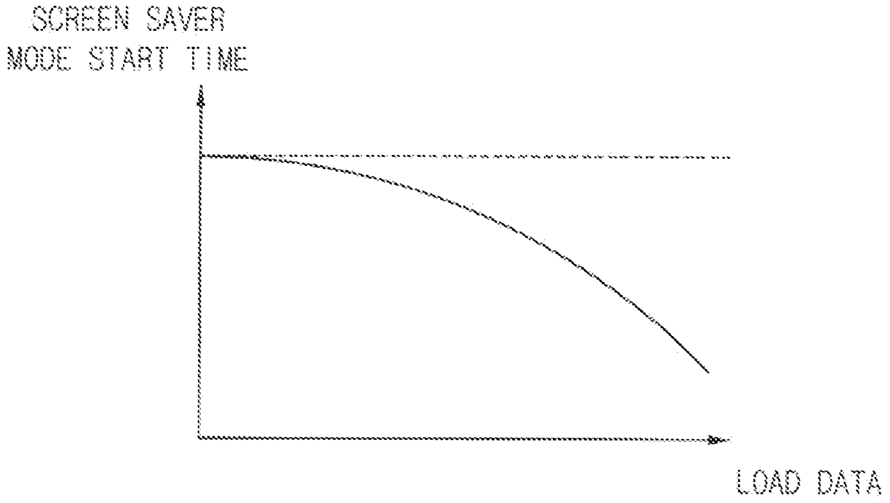
FIGS. 4*a* and 4*b* are graphs illustrating a change in a start time of a screen saver mode and a change in a minimum luminance of the screen saver mode when load data of the display panel is increased.
Figure 4B:
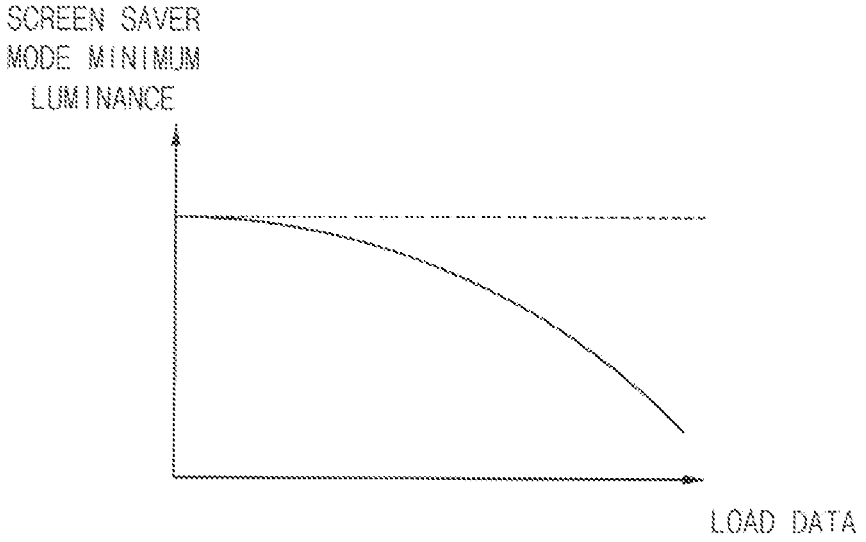
Figure 5A:
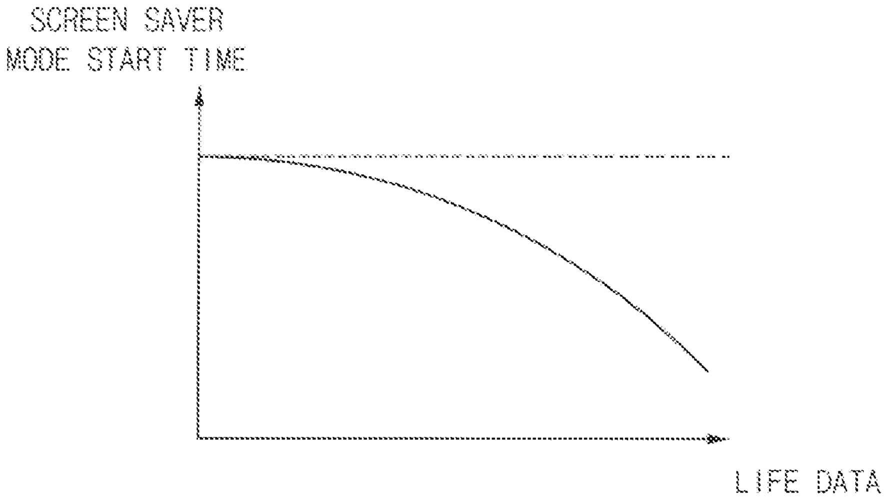
FIGS. 5*a* and 5*b* are graphs illustrating a change in a start time of a screen saver mode and a change in a minimum luminance of the screen saver mode when life data of the display panel is increased.
Figure 5B:
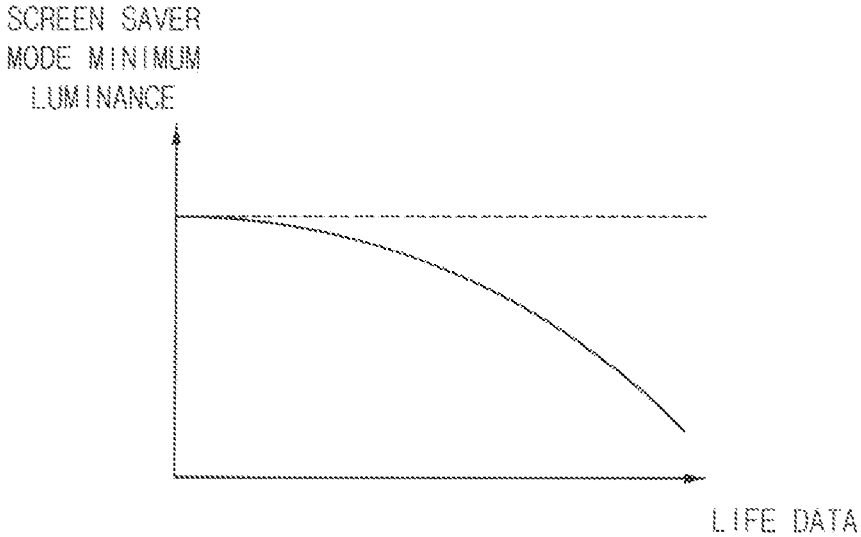

FIG. 3 is a block diagram illustrating an embodiment of the screen saver controller 600 included in the display device 10 of FIG. 1. FIGS. 4*a* and 4*b* are graphs illustrating a change in a start time TSS of a screen saver mode and a change in a minimum luminance LM of the screen saver mode when load data LD of the display panel 100 is increased. FIGS. 5*a* and 5*b* are graphs illustrating a change in a start time TSS of a screen saver mode and a change in a minimum luminance LM of the screen saver mode when life data of the display panel 100 is increased.

Referring to FIGS. 1 to 3, the screen saver controller 600 includes a load calculator (e.g., a logic circuit) 610 for generating load data LD, a life calculator 620 (e.g., logic circuit) for generating life data AD, an operation data generator 630 (e.g., a logic circuit) for generating operation data including gain data GD, and a screen saver data generator 640 (e.g., a logic circuit) for generating screen saver data SSD. The screen saver controller 600 may determine whether to operate in the screen saver mode based on the input image data IMG. In an embodiment, the screen saver controller 600 determines to operate in the screen saver mode when the input image data IMG corresponds to a static or non-moving image or a portion of the input image data IMG has an intensity that exceeds a certain threshold. When the screen saver mode is operated in the display device 10, the timing controller 200 may adjust the luminance of the display panel 100 based on the screen saver data SSD.

The load calculator 610 may generate load data LD of each of the panel blocks included in the display panel 100 based on the input image data IMG. In an embodiment, the load data LD of a given panel block among the panel blocks is calculated from an average intensity of intensities of the pixels of the given panel block. In an embodiment, the load data LD of the given panel block is generated from an average voltage of data voltages applied to the pixels of the given panel block. Specifically, the load calculator 610 may store load data LD corresponding to the input image data IMG in the form of a lookup table LUT. The load calculator 610 may select the load data LD corresponding to the input image data IMG from the lookup table, and calculate the load data LD of each of the panel blocks to transmit the load data LD to the operation data generator 630. The lookup table may be any storage device in which the load data LD corresponding to the input image data IMG is stored. For example, the load calculator 610 may calculate the load data LD in units of the large panel block 110. The large panel block 110 may include 240*120 pixels P. The load calculator 610 may select the load data LD corresponding to the input image data IMG from the lookup table, and calculate the load data LD in units of the large panel block 110 to transmit the load data LD to the operation data generator 630. In another example, the load calculator 610 may calculate the load data LD in units of the small panel block 120. The small panel block 120 may include 8*8 pixels. The load calculator 610 may select the load data LD corresponding to the input image data IMG from the lookup table, and calculate the load data LD in units of the small panel block 120 to transmit the load data LD to the operation data generator 630.

The life calculator 620 may generate life data AD of each of the panel blocks based on a deterioration stress value accumulated in the display panel 100. In an embodiment, the life calculator 620 accumulates deterioration stress values for each of the panel blocks representing a deterioration stress level of each of the panel blocks to generate an accumulated value and stores the accumulated value into a nonvolatile memory device of the display device 19, and generates the life data AD according to the accumulated value. In an embodiment, the accumulating sums the deterioration stress values. In another embodiment, the accumulating averages the deterioration stress values. When calculating the life data AD, the life calculator 620 may consider several factors that cause the deterioration stress. For example, the life calculator 620 may accumulate the deterioration stress values in consideration of temperature data, position data of the panel block, number of light emissions and period of the light emission, and generate the life data AD of each of the panel blocks based on the factors. For example, the life calculator 620 may apply different weights to the deterioration stress values during the accumulating based on the factors. In an embodiment, an increase in a value of the life data AD signifies that the deterioration stress applied to the panel block is large or exceeds a certain threshold. In other words, the increase in the value of the life data AD may signify that an accumulated usage amount of the panel blocks is large. In an embodiment, the life calculator 620 calculates the life data AD in units of the large panel block 110. The large panel block 110 may include 240*120 pixels P. The life calculator 620 may accumulate the deterioration stress values to generate an accumulated deterioration stress value and store the accumulated deterioration stress value of the display panel 100 into a nonvolatile memory device, calculate the life data AD in a unit of the large panel block 110 according to the accumulated deterioration stress value and transmit the life data AD to the operation data generator 630. In another example, the life calculator 620 calculates the life data AD in units of the small panel block 120. The small panel block 120 may include 8*8 pixels. The life calculator 620 may accumulate the deterioration stress values to generate an accumulated deterioration stress value and store the accumulated deterioration stress value of the display panel 100 into a nonvolatile memory device, calculate the life data AD in a unit of the small panel block 120 according to the accumulated deterioration stress value and transmit the life data AD to the operation data generator 630.

Referring to FIGS. 3 and 4*a* to 5*b*, the operation data generator 630 generates gain data GD based on the load data LD and the life data AD. The operation data generator 630 may generate the gain data GD, and transmit the gain data GD to the screen saver data generator 640. In an embodiment, the operation data generator 630 generates start time gain data for adjusting the start time TSS of the screen saver mode according to the load data LD and the life data AD. The operation data generator 630 may generate minimum luminance gain data for adjusting the minimum luminance LM of the screen saver mode according to the load data LD and the life data AD. For example, the operation data generator 630 may generate the start time gain data for allowing the screen saver mode to be adjusted to start earlier as the load data LD increases. The operation data generator 630 may transmit the start time gain data to the screen saver data generator 640. In addition, the operation data generator 630 may generate the minimum luminance gain data for adjusting the minimum luminance of the screen saver mode to be lower as the load data LD increases. The operation data generator 630 may transmit the minimum luminance gain data to the screen saver data generator 640. In another example, the operation data generator 630 may generate the start time gain data for allowing the screen saver mode to be adjusted to start earlier as the life data AD increases. The operation data generator 630 may transmit the start time gain data to the screen saver data generator 640. In an embodiment, the operation data generator 630 generates the minimum luminance gain data for adjusting the minimum luminance of the screen saver mode to be lower as the life data AD increases. The operation data generator 630 may transmit the minimum luminance gain data to the screen saver data generator 640.

In an embodiment, the operation data generator 630 generates the start time gain data and the minimum luminance gain data based on the load data LD of a first panel block having a greatest load data LD among the panel blocks and the life data AD of the first panel block. In an embodiment, an overall intensity of each of the panel blocks is determined, and the panel block with the highest intensity has the greatest load data LD. Specifically, the operation data generator 630 may select the first panel block having the greatest load data LD among the panel blocks based on the load data LD. The operation data generator 630 may generate start time gain data for adjusting the start time TSS of the screen saver mode based on the life data AD of the first panel block. In addition, the operation data generator 630 may generate minimum luminance gain data for adjusting the minimum luminance LM of the screen saver mode based on the life data AD of the first panel block. For example, the start time TSS of the screen saver mode of the display device 10 may be earlier in proportion to the life data AD of the first panel block. In another example, the minimum luminance LM of the screen saver mode of the display device 10 may be lowered in proportion to the life data AD of the first panel block. For example, when a value of the current life data AD relative to the prior life data indicate a 10% decrease in the life of a panel block, the minimum luminance LM could be decreased by 10%.

In an embodiment, the operation data generator 630 generates the start time gain data and the minimum luminance gain data based on the load data LD of a first panel block having a greatest load data LD among the panel blocks, and the life data AD of a second panel block having the greatest life data AD among the panel blocks. Specifically, the operation data generator 630 may select the first panel block having the greatest load data LD among the panel blocks based on the load data LD. The operation data generator 630 may select the second panel block having the greatest life data AD among the panel blocks based on the life data AD. The operation data generator 630 may generate the start time gain data for adjusting the start time TSS of the screen saver mode based on the load data LD of the first panel block and the life data AD of the second panel block. In addition, the operation data generator 630 may generate the minimum luminance gain data for adjusting the minimum luminance LM of the screen saver mode based on the load data LD of the first panel block and the life data AD of the second panel block. For example, the start time TSS of the screen saver mode of the display device 10 may be earlier in proportion to the load data LD of the first panel block and the life data AD of the second panel block. In another example, the minimum luminance LM of the screen saver mode of the display device 10 is lowered in proportion to the load data LD of the first panel block and the life data AD of the second panel block.

In an embodiment, the operation data generator 630 generates the start time gain data and the minimum luminance gain data based on an average of the load data LD of the panel blocks, and an average of the life data AD of the panel blocks. Specifically, the operation data generator 630 may calculate the average of the load data LD of the panel blocks based on the load data LD. The operation data generator 630 may calculate the average of the life data AD of the panel blocks based on the life data AD. The operation data generator 630 may generate the start time gain data for adjusting the start time TSS of the screen saver mode based on the average of the load data LD of the panel blocks and the average of the life data AD of the panel blocks. In addition, the operation data generator 630 may generate the minimum luminance gain data for adjusting the minimum luminance LM of the screen saver mode based on the average of the load data LD of the panel blocks and the average of the life data AD of the panel blocks. For example, the start time TSS of the screen saver mode of the display device 10 may be earlier in proportion to the average of the load data LD of the panel blocks and the average of the life data AD of the panel blocks. In another example, the minimum luminance LM of the screen saver mode of the display device 10 is lowered in proportion to the average of the load data LD of the panel blocks and the average of the life data AD of the panel blocks.

The screen saver data generator 640 may generate the screen saver data SSD based on the input image data IMG. The screen saver data generator 640 may receive the input image data IMG from the timing controller 200. The screen saver data generator 640 may receive the gain data GD from the operation data generator 630. In an embodiment, the screen saver data generator 640 generates the screen saver data SSD based on input image data IMG and the gain data GD, and transmits the screen saver data SSD to the timing controller 200. The timing controller 200 may allow the display panel 100 to operate in the screen saver mode to adjust the luminance of the display panel 100.

Accordingly, the screen saver controller of the present inventive concept may provide the screen saver mode optimized for the display panel 100 by using the load data LD and the life data AD of the display panel 100, so that visual recognition of an afterimage on the display panel 100 can be improved and the lifespan of the display panel 100 can be increased.

Figure 6:
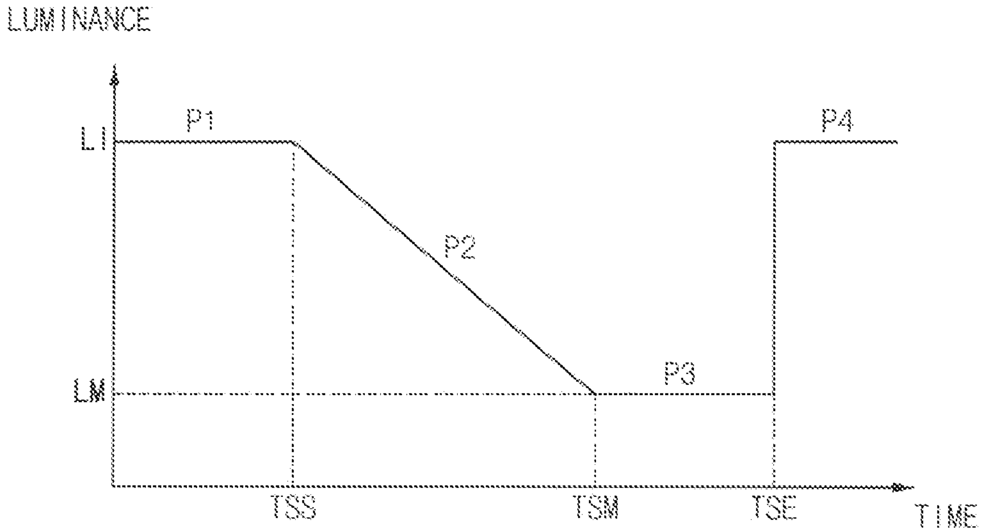
FIG. 6 is a graph illustrating a change in luminance of an image displayed on the display panel when the screen saver mode is operated.
Figure 7:
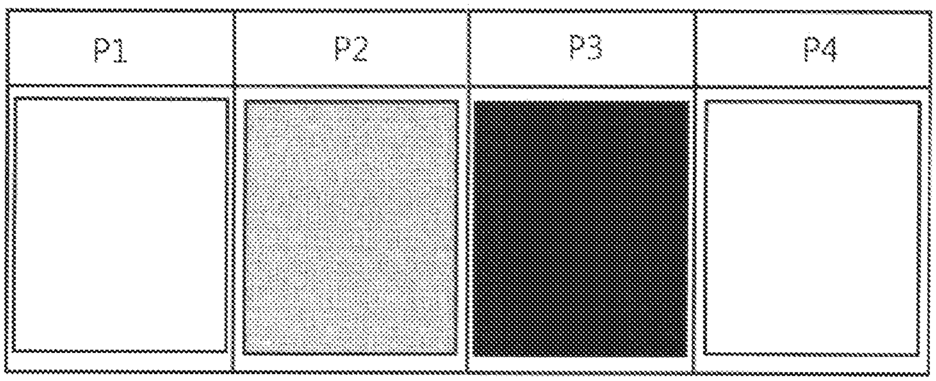
FIG. 7 is a diagram illustrating an example of a change in luminance of an image displayed on the display panel for each period of FIG. 6.
Figure 8:
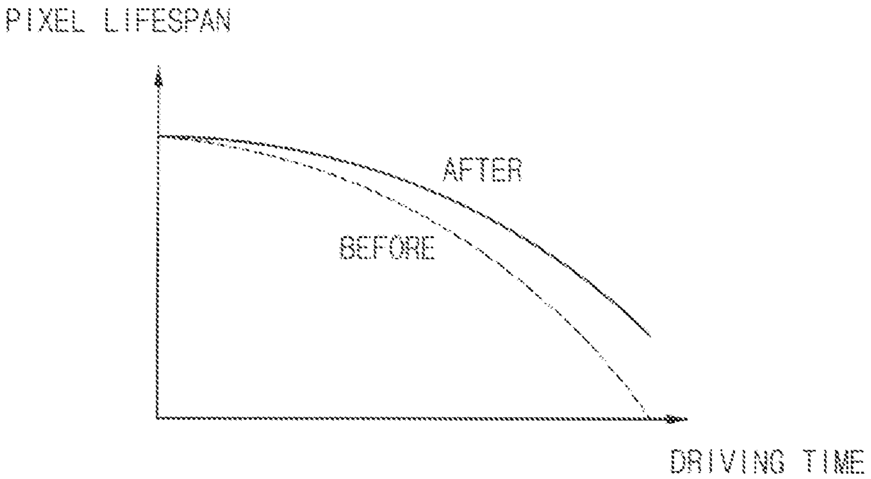
FIG. 8 is a graph illustrating a change in pixel life according to a driving time of the display device when a screen saver data generator generates screen saver data based on gain data.

FIG. 6 is a graph illustrating a change in luminance of an image displayed on the display panel 100 when the screen saver mode is operated. FIG. 7 is a diagram illustrating an example of a change in luminance of an image displayed on the display panel 100 for each period of FIG. 6. FIG. 8 is a graph illustrating a change in pixel life according to a driving time of the display device 10 when the screen saver data generator 640 generates the screen saver data SSD based on the gain data GD.

Referring to FIGS. 3 to 8, the display device 10 determines whether to operate in the screen saver mode based on the input image data IMG. The display device 10 may determine whether the image displayed on the display panel 100 is a still image based on the input image data IMG. When the still image displayed on the display panel 100 continues for a predetermined period of time, the screen saver controller 600 may generate the screen saver data SSD based on the input image data IMG and output the screen saver data SSD to the timing controller 200.

In an embodiment, the screen saver controller 600 provides the screen saver mode optimized for the display panel 100 based on the load data LD and the life data AD. Specifically, the screen saver controller 600 may optimize the start time TSS of the screen saver mode based on the load data LD and the life data AD. For example, the operation data generator 630 may generate the start time gain data based on the load data LD and the life data AD. Referring to FIG. 6, as the load data LD and life data AD increases, the start time TSS of the screen saver mode may be decreased or moved to an earlier time. In other words, when the load data LD and life data AD become large, the screen saver mode start time TSS may be shifted leftward in a time axis (X-axis) of the graph of FIG. 6. In an embodiment, life data AD is large when it is determined that an after image is likely to be perceived in one or more of the panel blocks in the near future, and the life data AD is not large when it is determined that an after image is not likely to be perceived in the near future. In addition, the screen saver controller 600 may optimize the minimum luminance LM of the screen saver mode based on the load data LD and the life data AD. For example, the operation data generator 630 may generate the minimum luminance gain data based on the load data LD and the life data AD. Referring to FIG. 6, as the load data LD and life data AD increases, the minimum luminance LM of the screen saver mode may be decreased. In other words, when the load data LD and life data AD become large, the minimum luminance LM of the screen saver mode may shifted downward in a luminance axis (Y-axis) of the graph of FIG. 6.

In an embodiment, when the display device 10 operates in the screen saver mode, the luminance of the display panel 100 is gradually decreased as in a second period P2. Referring to FIG. 7, the display panel 100 may maintain the minimum luminance as in a third period P3 from the point (TSM) when the luminance of the display panel 100 is decreased to the minimum luminance of the screen saver mode. Meanwhile, during a screen saver mode operation, the screen saver mode may be canceled or be exited at the time when a predetermined change occurs (TSE) as in a fourth period P4, and the luminance of the display panel 100 may be increased to a normal luminance LI. For example, the luminance of the display panel 100 in a first period P1 may be the normal luminance LI in which the screen saver mode is not operated. The display panel 100 in the second period P2 may have a luminance between the normal luminance LI and the minimum luminance LM. The display panel 100 in the third period P3 may have the minimum luminance LM of the screen saver mode. For example, during the fourth period P4, the image data IMG may correspond to a moving image.

Referring to FIG. 8, when the screen saver data generator 640 generates the screen saver data SSD based on the input image data IMG and the gain data GD, the luminance of the display panel 100 in the third period P3 is lower than when the screen saver data generator 640 generates the screen saver data SSD based only on the input image data IMG. Accordingly, the lifespan of the pixels included in the display panel 100 may be increased when the screen saver data generator 640 generates the screen saver data SSD based on the gain data GD compared to the case where the screen saver data SSD is generated without the gain data GD. In particular, a difference in pixel life may be increased when the driving time of the display panel 100 is increased. In other words, when the screen saver data generator 640 generates the screen saver data SSD based on the gain data GD, the display panel 100 may receive less deterioration stress.

Accordingly, when the display device 10 of the present inventive concept operates in the screen saver mode optimized for the display panel 100 by using the load data LD generated by the load calculator 610 and the life data AD generated by the life calculator 620, visual recognition of an afterimage on the display panel 100 can be improved and lifespan of the display panel 100 can be increased.

Figure 9:
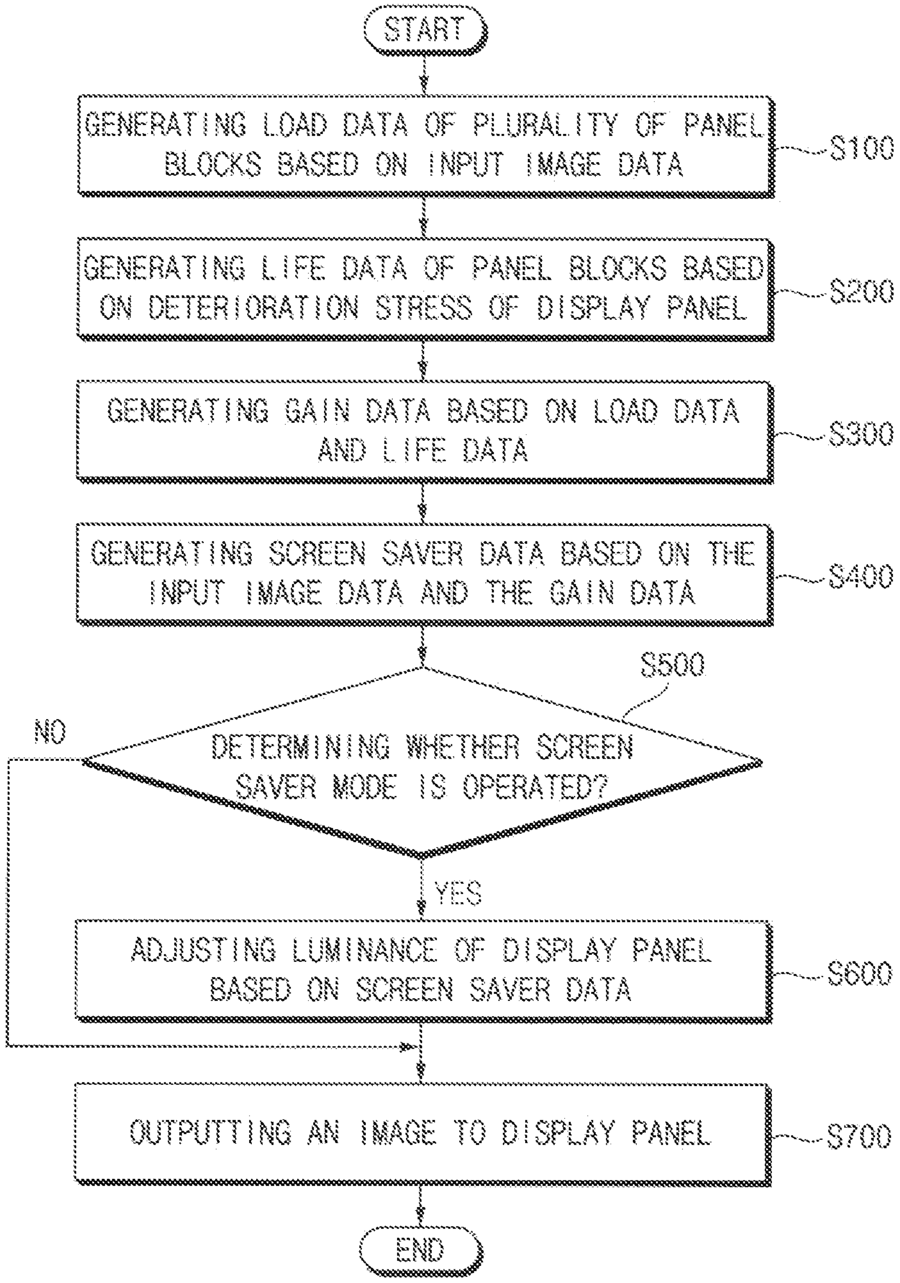
FIG. 9 is a flowchart illustrating an example in which the screen saver mode is executed in the display device 10.

FIG. 9 is a flowchart illustrating an example in which the screen saver mode is executed in the display device 10.

Referring to FIG. 9, the display device 10 of the present inventive concept generates the load data LD of the panel blocks based on the input image data IMG (S100), generates life data AD of each of the panel blocks based on the deterioration stress values accumulated in the display panel 100 (S200), generates the gain data GD based on the load data LD and the life data AD (S300), generates the screen saver data SSD based on the input image data IMG and the gain data GD (S400), and determines whether to operate in the screen saver mode based on the input image data IMG (S500). In an embodiment, the display device 10 determines whether to operate in the screen saver mode when the input image data IMG includes a static or non-moving image and/or when an average intensity of one of the panel blocks exceeds a certain threshold. When the display device 10 operates in the screen saver mode, the display device 10 adjusts the luminance of the display panel 100 based on the screen saver data SSD (S600), and outputs an image to the display panel 100 (S700). Meanwhile, when the display device 10 does not operate in the screen saver mode, the display device 10 outputs the image to the display panel 100 without adjusting the luminance of the display panel 100 (S700).

In one embodiment, the load calculator 610 and the life calculator 620 calculate load data LD and life data AD that serve as criteria of the gain data GD. The load calculator 610 may generate the load data LD of the panel blocks based on the input image data IMG (S100). Specifically, the load calculator 610 may store load data LD corresponding to the input image data IMG in the form of a lookup table LUT. The load calculator 610 may select the load data LD corresponding to the input image data IMG from the lookup table, calculate the load data LD of each of the panel blocks and transmit the load data LD to the operation data generator 630. The life calculator 620 may generate life data AD of each of the panel blocks based on deterioration stress values accumulated in the display panel 100 (S200). Specifically, the life calculator 620 may accumulate deterioration stress values of the display panel 100 to generate an accumulated stress value and store the accumulated deterioration stress value into a nonvolatile memory device, and generate the life data AD according to the accumulated deterioration stress value. In an embodiment, an increase in the life data AD signifies that the deterioration stress applied to the panel block is large or greater than a threshold.

In an embodiment, the operation data generator 630 generates the gain data GD based on the load data LD and the life data AD (S300). For example, the operation data generator 630 may generate start time gain data for adjusting the start time TSS of the screen saver mode according to the load data LD and the life data AD. The operation data generator 630 may generate the start time gain data for allowing the screen saver mode to be adjusted to start earlier as the load data LD increases. The operation data generator 630 may generate the start time gain data for allowing the screen saver mode to be adjusted to start earlier as the life data AD increases. In another example, the operation data generator 630 may generate minimum luminance gain data for adjusting the minimum luminance LM of the screen saver mode according to the load data LD and the life data AD. The operation data generator 630 may generate the minimum luminance gain data for adjusting the minimum luminance of the screen saver mode to be lower as the load data LD increases. The operation data generator 630 may generate the minimum luminance gain data for adjusting the minimum luminance of the screen saver mode to be lower as the life data AD increases.

In an embodiment, the screen saver data generator 640 generates the screen saver data SSD based on the input image data IMG and the gain data GD (S400). The screen saver data generator 640 may receive the input image data IMG from the timing controller 200. The screen saver data generator 640 may receive the gain data GD from the operation data generator 630. The screen saver data generator 640 may generate the screen saver data SSD based on input image data IMG and the gain data GD, and transmit the screen saver data SSD to the timing controller 200.

Accordingly, the screen saver controller of the present inventive concept may provide the screen saver mode optimized for the display panel 100 by using the load data LD and the life data AD of the display panel 100.

The screen saver controller may determine whether to operate the screen saver mode based on the input image data IMG (S500). When the display device 10 operates in the screen saver mode, the display device 10 may adjust the luminance of the display panel 100 based on the screen saver data SSD (S600), and output an image to the display panel 100 (S700). Specifically, when the display device 10 operates in the screen saver mode, the luminance of the display panel 100 may be gradually decreased. When the luminance of the display panel 100 is decreased to the minimum luminance of the screen saver mode, the display panel 100 may maintain the minimum luminance. Meanwhile, during a screen saver mode operation, when a predetermined change occurs, the screen saver mode may be canceled or exited and the luminance of the display panel 100 may be increased to a normal luminance LI. In an embodiment, when the display device 10 does not operate in the screen saver mode, the display device 10 outputs the image to the display panel 100 without adjusting the luminance of the display panel 100 (S700). For example, the predetermined condition could be the image data IMG indicating a moving image.

The lifespan of the pixels included in the display panel 100 according to an embodiment of the present inventive concept may be increased when the screen saver data generator 640 generates the screen saver data SSD based on the gain data GD compared to the case where the screen saver data SSD is generated without the gain data GD. In particular, a difference in pixel life may be increased when the driving time of the display panel 100 is increased. In other words, when the screen saver data generator 640 generates the screen saver data SSD based on the gain data GD, the display panel 100 may receive less deterioration stress. Accordingly, the screen saver controller of the present inventive concept may provide the screen saver mode optimized for the display panel 100 by using the load data LD and the life data AD of the display panel 100, so that visual recognition of an afterimage on the display panel 100 can be improved and lifespan of the display panel 100 can be increased.

Figure 10:
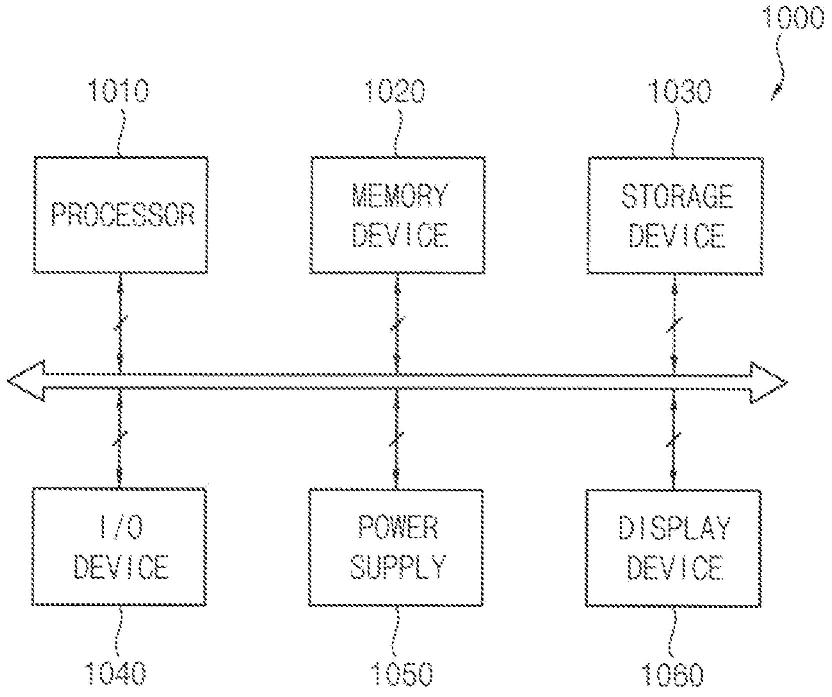
FIG. 10 is a block diagram illustrating an electronic device according to an embodiment of the present inventive concept.
Figure 11:
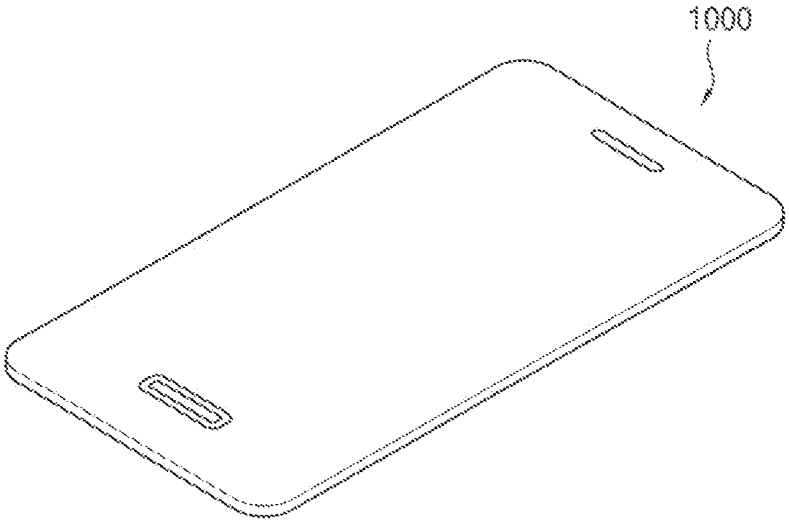
FIG. 11 is a diagram illustrating an example in which the electronic device of FIG. 10 is implemented as a smartphone.

FIG. 10 is a block diagram illustrating an electronic device according to an embodiments of the present inventive concept. FIG. 11 is a diagram illustrating an example in which the electronic device of FIG. 10 is implemented as a smartphone.

Referring to FIGS. 10 and 11, the electronic device 1000 includes a processor 1010, a memory device 1020, a storage device 1030, an input/output (I/O) device 1040, a power supply 1050, and a display device 1060. In addition, the electronic device 1000 may further include a plurality of ports for communicating with a video card, a sound card, a memory card, a universal serial bus (USB) device, or another electronic device. In an embodiment, as illustrated in FIG. 11, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, or a head mounted display (HMD) device.

The processor 1010 may perform various computing functions. The processor 1010 may be a micro processor, a central processing unit (CPU), or an application processor (AP). The processor 1010 may be coupled to other components via an address bus, a control bus, or a data bus. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or at least one volatile memory device such as a dynamic random access memory (DRAM) device, a static random access memory (SRAM) device, or a mobile DRAM device. The storage device 1030 may include a solid state drive (SSD) device, a hard disk drive (HDD) device, or a CD-ROM device. The I/O device 1040 may include an input device such as a keyboard, a keypad, a mouse device, a touch-pad, or a touch-screen, and an output device such as a printer or a speaker. In some embodiments, the I/O device 1040 may include the display device 1060. The power supply 1050 may provide power for operations of the electronic device 1000.

The display device 1060 may display an image corresponding to visual information of the electronic device 1000. The display device 1060 may include a display panel including a plurality of pixels, a data driver for providing a data signal to the display panel, a gate driver for providing a gate signal to the display panel, a timing controller for controlling the data driver and the gate driver and a screen saver controller for determining whether to operate a first mode based on input image data, and adjusting a luminance of the display panel based on screen saver data during operating the first mode. For example, the display device 1060 may include the display panel driver 120. The screen saver controller may include a load calculator for generating load data of each of a plurality of panel blocks included in a display panel based on input image data, a life calculator for generating life data of each of the panel blocks based on deterioration stress value accumulated in the display panel, an operation data generator for receiving the load data and the life data, and generating operation data based on the load data and the life data and a screen saver data generator for receiving the input image data and the operation data, and generating screen saver data based on the input image data and the operation data. The screen saver controller may determine whether to operate in a first mode based on the input image data, and adjust a luminance of the display panel based on the screen saver data during operating the first mode. The screen saver controller may provide a screen saver mode optimized for the display panel by using the load data and the life data of the display panel, so that visual recognition of an afterimage of the display panel can be improved. In addition, the screen saver controller may provide a screen saver mode optimized for the display panel by using the load data and the life data of the display panel, so that the lifespan of the display panel can be increased.

The foregoing is illustrative of the present inventive concept and is not to be construed as limiting thereof. Although a few embodiments of the present inventive concept have been described, those of ordinary skill in the art will readily appreciate that many modifications are possible in the embodiments without materially departing from the present inventive concept. Accordingly, all such modifications are intended to be included within the scope of the present inventive concept as defined in the claims.

What is claimed is:

1. A screen saver controller comprising:

a first logic circuit for generating load data of each of a plurality of panel blocks included in a display panel based on input image data;

a second logic circuit for generating life data of each of the panel blocks based on a deterioration stress value accumulated in the display panel;

a third logic circuit for receiving the load data and the life data, and generating operation data including a start time gain data indicating a start time set to a first time when the load data and the life data are greater than a threshold and otherwise set to a second time after the first time; and a fourth logic circuit for receiving the input image data and the operation data, and generating screen saver data based on the input image data and the operation data, wherein the screen saver controller maintains a luminance of the display panel until the start time and then starts adjusting the luminance at the start time based on the screen saver data when operating in a screen saver mode for performing a screen saver operation, wherein the luminance is maintained for a first period ending at the first time and the luminance begins being gradually decreased at the first time when the load data and the life data are greater than the threshold, and otherwise the luminance is maintained for a second period larger than the first period that ends at the second time and the luminance begins being gradually decreased at the second time.

2. The screen saver controller of claim 1, wherein the third logic circuit generates the operation data including minimum luminance gain data for adjusting a minimum luminance of the screen saver mode based on the load data and the life data.

3. The screen saver controller of claim 2, wherein the first logic circuit generates the load data according to a lookup table in which the load data corresponding to the input image data is stored.

4. The screen saver controller of claim 3, wherein the third logic circuit generates the start time gain data for controlling the screen saver mode to start earlier as a value of the load data increases.

5. The screen saver controller of claim 3, wherein the third logic circuit generates the minimum luminance gain data for adjusting the minimum luminance of the screen saver mode to be lower as a value of the load data increases.

6. The screen saver controller of claim 2, wherein the second logic circuit accumulates deterioration stress values of the panel blocks to generate an accumulated value and stores the accumulated value in a nonvolatile memory device, and generates the life data according to the accumulated value.

7. The screen saver controller of claim 6, wherein the third logic circuit generates the start time gain data for controlling the screen saver mode to start earlier as a value of the life data increases.

8. The screen saver controller of claim 6, wherein the third logic circuit generates the minimum luminance gain data for adjusting the minimum luminance of the screen saver mode to be lower as a value of the life data increases.

9. The screen saver controller of claim 2, wherein the third logic circuit generates the start time gain data and the minimum luminance gain data based on the load data of a first panel block having a greatest load data among the panel blocks, and the life data of the first panel block.

10. The screen saver controller of claim 2, wherein the third logic circuit generates the start time gain data and the minimum luminance gain data based on the load data of a first panel block having a greatest load data among the panel blocks, and the life data of a second panel block having a greatest life data among the panel blocks.

11. The screen saver controller of claim 2, wherein the third logic circuit generates the start time gain data and the minimum luminance gain data based on an average of the load data of the panel blocks, and an average of the life data of the panel blocks.

12. A display device comprising:
- the screen saver controller of claim 1;
- a display panel including a plurality of pixels;
- a data driver for providing a data signal to the display panel;
- a gate driver for providing a gate signal to the display panel; and
- a timing controller for controlling the data driver and the gate driver.

13. A method of operating a display device, the method comprising:
- generating load data of each of a plurality of panel blocks included in a display panel of the display device based on input image data;
- generating life data of each of the panel blocks based on a deterioration stress value accumulated in the display panel;
- generating operation data including a start time gain data indicating a start time set to a first time when the generated load data and the generated life data are greater than a threshold and otherwise set to a second time after the first time;
- generating screen saver data based on the input image data and the operation data; and
- maintaining a luminance of the display panel until the start time and then starting to adjust the luminance at the start time based on the screen saver data when operating in a screen saver mode for performing a screen saver operation mode,
- wherein the luminance is maintained for a first period ending at the first time and the luminance begins being gradually decreased at the first time when the load data and the life data are greater than the threshold, and otherwise the luminance is maintained for a second period larger than the first period that ends at the second time and the luminance begins being gradually decreased at the second time.

14. The method of claim 13, wherein the generating of the life data includes determining deterioration stress values of each of the panel blocks, accumulating the determined deterioration stress values to generate an accumulated value, and generating the life data from the accumulated value.

15. The method of claim 13, wherein the load data of a corresponding one of the panel blocks is an intensity of the corresponding panel block.

* * * * *